United States Patent Office 3,249,618
Patented May 3, 1966

3,249,618
N-(CARBAMYLMETHYL)-4-PHENYL-4-
CARBETHOXY PIPERIDINES
Rolf Denss, 43 Schutzenmattstrasse; Alex Meisels, 13
Zurcherstrasse; and Hugo Ryf, 5 Rosentalstrasse, all
of Basel, Switzerland
No Drawing. Filed Jan. 4, 1965, Ser. No. 423,335
Claims priority, application Switzerland, Nov. 25, 1960,
13,252/60
6 Claims. (Cl. 260—294.3)

This patent application is a continuation-in-part of our copending application Serial No. 154,851 filed November 24, 1961 (now abandoned).

The present invention relates to new piperidine derivatives having valuable pharmacological properties.

It is well known that 1-carbamyl-ethyl and higher alkyl-4-phenyl-4-carbethoxy-piperidines substituted in the amide group by a phenyl radical are useful antitussive agents. However, it is also known that these compounds are strong analgesics as confirmed, for instance, by laboratory rodent tests, such as the Gross-Friebel test [method of A. Gross described in "Arch. Exp. Path. and Pharmakologie" 229, 400 (1956) using the apparatus according to Friebel and Reichle; also see d'Amour et al, J. Pharmacol. Exptl. Therapy 12, 14 (1944) and Bass et al., in J. American Pharm. Assoc. (Sci. Ed.) 41 509 (1952), which tests are at the same time indicative of the habit-forming properties of these compounds.

It is an object of this invention to provide antitussive agents which are not habit-forming, i.e. which in laboratory rodent tets show such low analgesic effects that habit-forming properties are not indicated. In the above-mentioned Gross-Friebel test this means that values of 25% elevation of pain-threshold must not be exceeded.

This object is attained by the compounds of the present invention which are of the formula

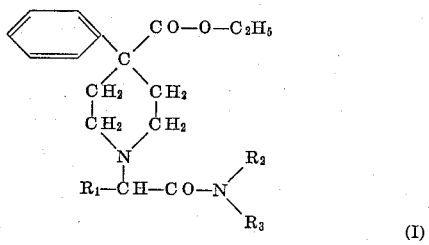

(I)

wherein $R_1$ is a member selected from the group consisting of hydrogen and methyl, $R_2$ is a member selected from the group consisting of phenyl, methylphenyl, dimethylphenyl and trimethylphenyl, and $R_3$ is a member selected from the group consisting of hydrogen and lower alkyl, especially methyl, at least one of $R_1$, $R_2$ and $R_3$ containing, or, as the case may be, being, a methyl group, as well as the pharmaceutically acceptable acid addition salts thereof, which piperidino derivatives are valuable anti-tussive agents, the analgesic activity of which does not exceed the above-named critical limit in the Gross-Friebel test.

The anti-tussive agents according to the invention can be administered perorally as such or in the form of their salts and in the form of aqueous solutions of their salts, also parenterally.

To produce the new compounds of the Formula I, 4-phenyl-4-ethoxycarbonyl-piperidine (II) is reacted with reactive esters of hydroxyalkane carboxylic acid amides of the formula

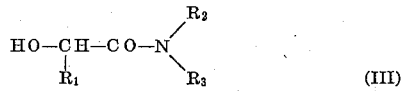

(III)

wherein $R_1$, $R_2$ and $R_3$ have the meanings given above, in particular with the halides thereof.

The reaction is performed preferably in the presence of inorganic or organic acid binding agents such as e.g. sodium or potassium carbonate or tertiary organic bases such as triethylamine, tributylamine, dimethylaniline or pyridine. It is performed in an inert organic solvent such as e.g. anhydrous methanol, ethanol, butanol or isopropanol, dimethylformamide, benzene, toluene or decaline, in the warm e.g. at the boiling temperature of the solvents mentioned. Various starting materials of the Formula III are known and others can be produced in an analogous manner.

A second process for the production of compounds of the Formula I consists in reacting reactive functional derivatives of carboxylic acids of the formula

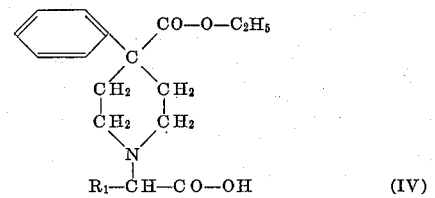

(IV)

wherein $R_1$ has the meaning above, with a compound of the formula

(V)

wherein $R_2$ and $R_3$ have the meanings given above.

As reactive functional derivatives of carboxylic acids of the Formula IV, in particular their halides, lower alkyl esters as well as e.g. mixed anhydrides with acetic acid or carbonic acid half esters, can be employed.

For example, halides, in particular chlorides, of acids of the Formula IV or their hydrochlorides are reacted with amines of the Formula V in the presence of acid binding agents, in particular in the presence of excess amine in the presence or absence of an inert organic solvent such as e.g. toluene, benzene, methylene chloride or trichloro-ethylene.

By reacting 4-phenyl-4-ethoxycarbonyl-piperidine with halogen-lower alkanoic acids, e.g. in alcohol at room temperature, the carboxylic acids of the Formula IV are obtained which serve as starting materials for the above process either direct or after they have been converted into reactive functional derivatives of halides, in particular hydrohalides, by treatment with inorganic acid halides.

If desired, the compounds of the Formula I are converted in the known manner into their addition salts with inorganic or organic acids. Acids suitable for salt formation are e.g. hydrochloric acid, hydrobromic acid, sulfuric acid, phosphoric acid, methane sulfonic acid, ethane disulfonic acid, acetic acid, lactic acid, succinic acid, maleic acid, fumaric acid, malic acid, tartaric acid, citric acid, benzoic acid, salicylic acid and mandelic acid.

The new compounds or compatible salts thereof are useful as medicaments, for example, in the form of pharmaceutical preparations which contain the new compounds or pharmaceutically acceptable salts thereof in admixture with a pharmaceutical organic or inorganic solid or liquid carrier suitable for enteral or parenteral administration. Substances can be used to make up the preparations, which do not react with the new compounds such as, for example, water, gelatine, sugar, dextrose, lactose, starches, stearic acid, magnesium or calcium stearate, methyl cellulose, talcum, agar tragacanth, vegetable oils, benzyl alcohols, gums, polyalkylene glycols, cholesterol or any other known carrier for medicaments. The pharmaceutical preparations may be, for example, in the form of tablets, dragées, capsules, ointments, creams or in liquid form such as solutions, suspensions or emulsions.

The new compounds can also be incorporated into semi-solid substances which melt within a suitable range, e.g. cocoa butter, to form suppositories. They may also contain other therapeutically useful substances.

The following non-limitative examples further illustrate the production of the new compounds according to the invention. Parts are given therein as parts by weight; their relationship to parts by volume is as that of grams to milliliters. The temperatures are in degrees centigrade.

*Example 1*

5.3 parts of 4-phenyl-4-carbethoxy-piperidine carbonate (4-phenyl-isonipecotinic acid ethyl ester carbonate) produced according to Thorp & Walton, J. Chem. Soc. 1948, 559), 3.4 parts of chloroacetanilide [produced according to Jacobs & Heidelberg, J. Am. Chem. Soc. 39, 1441 (1917)] and 8.5 parts of anhydrous sodium carbonate in 50 parts by volume of anhydrous butanol are refluxed for 14 hours. After cooling, inorganic salts are filtered off and the butanol is distilled off in vacuo. On spraying the oily residue with ether, the product crystallizes out. After recrystallizing once from acetone/hexane, 1-N-phenyl-carbamylmethyl-4-phenyl-4-carbethoxy-piperidine is obtained in the form of colorless crystals which melt at 97–98°.

To convert it into the hydrochloride, anhydrous hydrogen chloride is passed through the ethereal solution of the base. After recrystallizing once from methanol/ether, the hydrochloride is obtained in the form of white crystals which melt at 170–171° (on decomposition).

*Example 2*

2.91 parts of 1-carboxymethyl-4-phenyl-4-carbethoxy-piperidine (produced from 4-phenyl-4-carbethoxy-piperidine carbonate and chloroacetic acid by allowing to stand for several days in methanol) and 0.79 part of piperidine are dissolved in 60 parts by volume of methylene chloride and a solution of 1.19 parts of thionyl chloride in 10 parts by volume of methylene chloride is added while stirring at 0–5°. The mixture is stirred for 2 hours at 0–5°. A solution of 0.93 part of aniline and 0.79 part of piperidine in 10 parts by volume of methylene chloride is then added dropwise at 0–5° and the reaction mixture is then stirred for 8 hours at room temperature. The solvent is then distilled off in vacuo, 2 N-sodium carbonate solution is added to the residue which is then repeatedly extracted with ether. The ethereal solution is washed several times with 2 N-sodium carbonate solution and then with water and finally is repeatedly extracted with 2 N-hydrochloric acid. The 1-N-phenylcarbamyl-methyl-4-phenyl-4-carbethoxy-piperidine can be obtained direct in crystalline form from the hydrochloric acid solution by the careful addition of concentrated sodium hydroxide solution at 0–5°. M.P. 97–98°. The hydrochloride melts at 170–171°. The preparation is identical with the compound described in Example 1.

The following 4-phenyl-4-carbethoxy-piperidines, which correspond to the Formula I, can be produced by the processes described in the above examples. In the following table, only the substituent in the 1-position is given.

| Ex. No. | Substituent in 1-position | B.P. or M.P. of the base | M.P. of a salt of the base |
|---|---|---|---|
| 3 | 1-[α-(N-phenyl-carbamyl)-ethyl]- | B.P.$_{0.05}$192–197° | Hydrobromide 195–196° |
| 4 | 1-(N-methyl-N-phenyl-carbamyl-methyl)- | B.P.$_{0.04}$183–189° | Hydrobromide 197–198° |
| 5 | 1-(N-ethyl-N-phenyl-carbamyl-methyl)- | B.P.$_{0.005}$172–177° | Diphosphate 116–119° |
| 6 | 1-[α-(N-phenyl-N-methyl-carbamyl)-ethyl]- | M.P. 81–82° | Hydrobromide 138–140° |
| 7 | 1-[α-(3'-methyl-phenyl-carbamyl)-ethyl]- | B.P.$_{0.03}$196–200° | Hydrochloride 184–185° |
| 8 | 1-(4'-methyl-phenyl-carbamyl-methyl)- | M.P. 91–92° | Hydrochloride 225–230° |
| 9 | 1-(3'-methyl-phenyl-carbamyl-methyl)- | M.P. 73–73.5° | Hydrochloride 182–187° |
| 10 | 1-(2'-methyl-phenyl-carbamyl-methyl)- | M.P. 109–110° | Hydrochloride 95–98° |
| 11 | 1-(2',5'-dimethyl-phenyl-carbamyl-methyl)- | M.P. 101–102° | Hydrochloride 154–157° |
| 12 | 1-(2',3'-dimethyl-phenyl-carbamyl-methyl)- | M.P. 104–105° | Hydrochloride 115–119° |
| 13 | 1-(2',6'-dimethyl-phenyl-carbamyl-methyl)- | M.P. 112–113° | Hydrochloride 110–113° |
| 14 | 1-(2',4',6'-trimethyl-phenyl-carbamyl-methyl)- | M.P. 133–134° | Hydrochloride 129–134° |

We claim:

1. A compound selected from the group consisting of a piperidine derivative of the formula

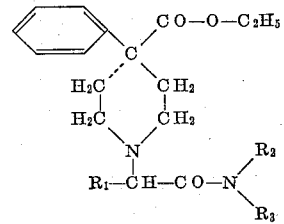

wherein $R_1$ is a member selected from the group consisting of hydrogen and methyl, $R_2$ is a member selected from the group consisting of phenyl, methylphenyl, dimethylphenyl and trimethylphenyl, and $R_3$ is a member selected from the group consisting of hydrogen and lower alkyl, at least one of $R_1$ and $R_3$ being methyl when $R_2$ is phenyl, and the pharmaceutically acceptable acid addition salts thereof.

2. 1-[α - (N - phenyl - carbamyl) - ethyl]-4-phenyl-4-carbethoxy-piperidine.

3. 1-[α - (N - methyl - N - phenyl - carbamyl) - ethyl]-4-phenyl-4-carbethoxy-piperidine.

4. 1 - (3' - methylphenyl - carbamyl - methyl) - 4 - phenyl-4-carbethoxy-piperidine.

5. 1 - (2' - methylphenyl - carbamyl - methyl) - 4 - phenyl-4-carbethoxy-piperidine.

6. 1 - (2',4',6'-trimethylphenyl - carbamyl - methyl)-4-phenyl-4-carbethoxy-piperidine.

References Cited by the Examiner

UNITED STATES PATENTS 3,093,652  6/1963  Elpern _____ 260—294.3
3,097,208  7/1963  Elpern _____ 260—294.3
3,117,128  1/1964  Mooradian _____ 260—294.3

NICHOLAS S. RIZZO, *Primary Examiner.*

UNITED STATES PATENT OFFICE
CERTIFICATE OF CORRECTION

Patent No. 3,249,618                                             May 3, 1966

Rolf Denss et al.

It is hereby certified that error appears in the above numbered patent requiring correction and that the said Letters Patent should read as corrected below.

In the grant, line 2, after "Switzerland," insert -- assignors to Geigy Chemical Corporation, of Greenburgh, New York, a corporation of Delaware, --; line 11, for "Rolf Denss, Alex Meisels, and Hugo Ryf, their heirs" read -- Geigy Chemical Corporation, its successors --; in the heading to the printed specification, lines 4 to 6, for "Rolf Denss, 43 Schutzenmattstrasse; Alex Meisels, 13 Zurcherstrasse; and Hugo Ryf, 5 Rosentalstrasse, all of Basel, Switzerland" read -- Rolf Denss, Alex Meisels, and Hugo Ryf, all of Basel, Switzerland, assignors to Geigy Chemical Corporation, Greenburgh, N. Y., a corporation of Delaware --; column 2, lines 34 to 37, the formula should appear as shown below instead of as in the patent:

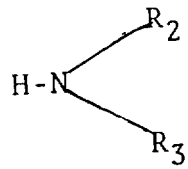

Signed and sealed this 1st day of August 1967.

(SEAL)
Attest:

EDWARD M. FLETCHER, JR.
Attesting Officer

EDWARD J. BRENNER
Commissioner of Paten